(12) United States Patent
Levakov et al.

(10) Patent No.: US 9,590,757 B2
(45) Date of Patent: Mar. 7, 2017

(54) EQUALIZER FOR JOINT-EQUALIZATION

(71) Applicants: Igor Levakov, Beer Sheva (IL); Haim Ben-Lulu, Rehovot (IL); Vincent Pierre Martinez, Castres (FR)

(72) Inventors: Igor Levakov, Beer Sheva (IL); Haim Ben-Lulu, Rehovot (IL); Vincent Pierre Martinez, Castres (FR)

(73) Assignee: NXP USA, INC., Austin, TX (US)

( * ) Notice: Subject to any disclaimer, the term of this patent is extended or adjusted under 35 U.S.C. 154(b) by 191 days.

(21) Appl. No.: 14/628,480

(22) Filed: Feb. 23, 2015

(65) Prior Publication Data
US 2016/0087741 A1   Mar. 24, 2016

(30) Foreign Application Priority Data
Sep. 23, 2014 (WO) .................. PCT/IB2014/002209

(51) Int. Cl.
| | |
|---|---|
| H04W 4/00 | (2009.01) |
| H04J 11/00 | (2006.01) |
| H04L 5/00 | (2006.01) |
| H04L 25/02 | (2006.01) |
| H04L 25/03 | (2006.01) |

(52) U.S. Cl.
CPC .......... *H04J 11/005* (2013.01); *H04L 5/0023* (2013.01); *H04L 5/0073* (2013.01); *H04L 25/0204* (2013.01); *H04L 25/03968* (2013.01)

(58) Field of Classification Search
None
See application file for complete search history.

(56) References Cited

U.S. PATENT DOCUMENTS

| | | |
|---|---|---|
| 8,364,739 B2 | 1/2013 | Baskaran et al. |
| 8,634,351 B2 | 1/2014 | Aue et al. |
| 2005/0175131 A1* | 8/2005 | Kansanen ......... H04L 25/03012 375/350 |

(Continued)

FOREIGN PATENT DOCUMENTS

EP    2363986 A1    9/2011

OTHER PUBLICATIONS

Tanguay, B. et al.; "Accelerating equalization algorithms using the Xtensa configurable processor"; Proceedings of 16th International Conference on Microelectronics; Dec. 6-8, 2004; pp. 434-437; IEEE.

(Continued)

*Primary Examiner* — Kenny Lin

(57) ABSTRACT

An equalizer for equalizing a composite signal originating from a given number of simultaneous data streams able to be received over a communication channel, on a given number of antennas, at one or more radio units, in a wireless communication system. The equalizer performs matrix operations when the number of receiving antennas associated with the composite signal is lower than the number of antennas supported by the equalizer. The channel matrix and the signal and interference covariance matrices are manipulated. The antenna dimension is increased, padding is then added and the transmitted signal vector is finally determined based on the altered matrices.

A baseband processing unit, a method and a computer program are also claimed.

14 Claims, 3 Drawing Sheets

(56) References Cited

U.S. PATENT DOCUMENTS

| | | | | |
|---|---|---|---|---|
| 2008/0298452 | A1* | 12/2008 | Sampath | H04B 7/0413 375/232 |
| 2010/0103997 | A1* | 4/2010 | Bocus | H04B 1/71055 375/232 |
| 2010/0306300 | A1 | 12/2010 | Lu et al. | |
| 2013/0266100 | A1* | 10/2013 | Gomadam | H04L 5/0023 375/346 |
| 2014/0334561 | A1* | 11/2014 | Liang | H04L 25/0204 375/260 |
| 2015/0063503 | A1* | 3/2015 | Kosakowski | H04L 1/0054 375/341 |
| 2015/0117507 | A1* | 4/2015 | Chiu | H04L 25/03159 375/232 |

OTHER PUBLICATIONS

Shankar, M.R.B. et al.; "Reduced complexity equalizations schemes for zero padded OFDM systems"; Signal Processing Letters; 2004; pp. 752-755; vol. 11, Issue 9; IEEE.

Wen, Wenkun et al.; "Low Complexity Pre-Equalization Algothrithms for Zero-Padded Block Transmission"; IEEE Transactions of Wireless Communications; Jul. 28, 2010; pp. 2498-2504; vol. 9, Issue 8; IEEE.

On channel estimation for ofdm systems—JJ van de Beek, O Edfors, M Sandell, SK Wilson, PO Börjesson Vehicular Technology Conference, 1995 IEEE 45th 2, 815-819 vol. 2.

Sreedhar, D.; Chockalingam, A, "MMSE Receiver for Multiuser Interference Cancellation in Uplink OFDMA," Vehicular Technology Conference, 2006. VTC 2006-Spring. IEEE 63rd , vol. 5, No., pp. 2125,2129, May 7-10, 2006.

Qixing Wang; Dajie Jiang; Jing Jin; Guangyi Liu; Zhigang Yan; Dacheng Yang, "Application of BBU+RRU Based Comp System to LTE-Advanced," Communications Workshops, 2009. ICC Workshops 2009. IEEE International Conference on , vol., No., pp. 1,5, Jun. 14-18, 2009.

Dajie Jiang; Qixing Wang; Jianjun Liu; Guangyi Liu; Chunfeng Cui, "Uplink Coordinated Multi-Point Reception for LTE-Advanced Systems," Wireless Communications, Networking and Mobile Computing, 2009. WiCom '09. 5th International Conference on , vol., No., pp. 1,4, Sep. 24-26, 2009.

Jing Jin; Qixing Wang; Li Zeng; Hongwen Yang; Yafeng Wang, "Coordinated multiple point reception scheme for the uplink of LTE-advanced system," Communications, 2009. APCC 2009. 15th Asia-Pacific Conference on , vol., No., pp. 230-233, Oct. 8-10, 2009.

Bai, Z.; Badic, B.; Iwelski, S.; Scholand, T.; Balraj, R.; Bruck, G.; Jung, P., "On the Equivalence of MMSE and IRC Receiver in MU-MIMO Systems," Communications Letters, IEEE , vol. 15, No. 12, pp. 1288,1290, Dec. 2011.

Ohwatari, Y.; Miki, N.; Asai, T.; Abe, T.; Taoka, H., "Performance of Advanced Receiver Employing Interference Rejection Combining to Suppress Inter-Cell Interference in LTE-Advanced Downlink," Vehicular Technology Conference (VTC Fall), 2011 IEEE , vol., No., pp. 1,7, Sep. 5-8, 2011.

Ohwatari, Y.; Miki, N.; Abe, T.; Taoka, H., "Investigation on Advanced Receiver Employing Interference Rejection Combining in Asynchronous Network for LTE-Advanced Downlink," Vehicular Technology Conference (VTC Spring), 2012 IEEE 75th , vol., No., pp. 1,6, May 6-9, 2012.

Juho Lee; Younsun Kim; Hyojin Lee; Boon Loong Ng; Mazzarese, D.; Jianghua Liu; Weimin Xiao; Yongxing Zhou, "Coordinated multipoint transmission and reception in LTE-advanced systems," Communications Magazine, IEEE , vol. 50, No. 11, pp. 44,50, Nov. 2012.

Lei Li; Jinhua Liu; Kaihang Xiong; Butovitsch, P., "Field test of uplink CoMP joint processing with C-RAN testbed," Communications and Networking in China (CHINACOM), 2012 7th International ICST Conference on , vol., No., pp. 753,757, Aug. 8-10, 2012.

Yuan Huiyu; Zheng Naizheng; Yan Yuyu; Skov, P., "Performance evaluation of coordinated multipoint reception in CRAN under LTE-Advanced uplink," Communications and Networking in China (CHINACOM), 2012 7th International ICST Conference on , vol., No., pp. 778,783, Aug. 8-10, 2012.

Ohwatari, Y.; Miki, N.; Sagae, Y.; Okumura, Y., "Investigation on Interference Rejection Combining Receiver for Space—Frequency Block Code Transmit Diversity in LTE-Advanced Downlink," Vehicular Technology, IEEE Transactions on , vol. 63, No. 1, pp. 191,203, Jan. 2014.

Ohwatari, Y.; Morimoto, A; Miki, N.; Okumura, Y., "Investigation on interference rejection combining receiver in heterogeneous networks for LTE-Advanced downlink," Signal Processing Advances in Wireless Communications (SPAWC), 2013 IEEE 14th Workshop on , vol., No., pp. 315,319, Jun. 16-19, 2013.

Tavares, F.M.L.; Berardinelli, G.; Mahmood, N.H.; Sorensen, T.B.; Mogensen, P., "On the Potential of Interference Rejection Combining in B4G Networks," Vehicular Technology Conference (VTC Fall), 2013 IEEE 78th , vol., No., pp. 1,5, Sep. 2-5, 2013.

Qing Huang; Yingmin Wang, "Linear receivers for multi-cell MIMO transmission in LTE-advanced downlink," Communications and Networking in China (CHINACOM), 2013 8th International ICST Conference on , vol., No., pp. 286,290, Aug. 14-16, 2013.

Yong Li; Zhangqin Huang, "Performance of LTE-A Uplink with Joint Reception and Inter-cell Interference Coordination," Dependable, Autonomic and Secure Computing (DASC), 2013 IEEE 11th International Conference on , vol., No., pp. 492,496, Dec. 21-22, 2013.

Winters, J.H., "Optimum Combining in Digital Mobile Radio with Cochannel Interference," Selected Areas in Communications, IEEE Journal on , vol. 2, No. 4, pp. 528,539, Jul. 1984 doi: 10.1109/JSAC.1984.1146095.

* cited by examiner

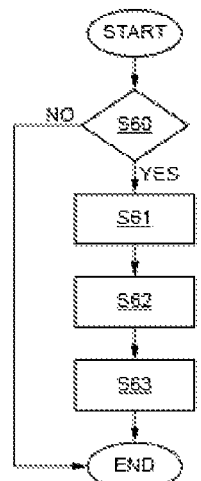

$$S_{6\times6}^{-1} = \begin{bmatrix} S_{0,0} & S_{0,1} & S_{0,2} & S_{0,3} & S_{0,4} & S_{0,5} \\ S_{1,0} & S_{1,1} & S_{1,2} & S_{1,3} & S_{1,4} & S_{1,5} \\ S_{2,0} & S_{2,1} & S_{2,2} & S_{2,3} & S_{2,4} & S_{2,5} \\ S_{3,0} & S_{3,1} & S_{3,2} & S_{3,3} & S_{3,4} & S_{3,5} \\ S_{4,0} & S_{4,1} & S_{4,2} & S_{4,3} & S_{4,4} & S_{4,5} \\ S_{5,0} & S_{5,1} & S_{5,2} & S_{5,3} & S_{5,4} & S_{5,5} \end{bmatrix}$$

$$S\_pad_{8\times8}^{-1} = \begin{bmatrix} Pad_{0,0} & Pad_{0,1} & Pad_{0,2} & Pad_{0,3} & Pad_{0,4} & Pad_{0,5} \\ Pad_{1,0} & Pad_{1,1} & Pad_{1,2} & Pad_{1,3} & Pad_{1,4} & Pad_{1,5} \\ Pad_{2,0} & Pad_{2,1} & & & & \\ Pad_{3,0} & Pad_{3,1} & & S_{6\times6}^{-1} & & \\ Pad_{4,0} & Pad_{4,1} & & & & \\ Pad_{5,0} & Pad_{5,1} & & & & \end{bmatrix}$$

OR $$\begin{bmatrix} & & & & Pad_{0,4} & Pad_{0,5} \\ & & & & Pad_{1,4} & Pad_{1,5} \\ & S_{6\times6}^{-1} & & & Pad_{2,4} & Pad_{2,5} \\ & & & & Pad_{3,4} & Pad_{3,5} \\ Pad_{4,0} & Pad_{4,1} & Pad_{4,2} & Pad_{4,3} & Pad_{4,4} & Pad_{4,5} \\ Pad_{5,0} & Pad_{5,1} & Pad_{5,2} & Pad_{5,3} & Pad_{5,4} & Pad_{5,5} \end{bmatrix}$$

OR $$\begin{bmatrix} Pad_{0,0} & Pad_{0,1} & Pad_{0,2} & Pad_{0,3} & Pad_{0,4} & Pad_{0,5} \\ Pad_{1,0} & & & & & Pad_{1,5} \\ Pad_{2,0} & & & & & Pad_{2,5} \\ Pad_{3,0} & & S_{6\times6}^{-1} & & & Pad_{3,5} \\ Pad_{4,0} & & & & & Pad_{4,5} \\ Pad_{5,0} & Pad_{5,1} & Pad_{5,2} & Pad_{5,3} & Pad_{5,4} & Pad_{5,5} \end{bmatrix}$$

FIG. 6

EQUALIZER FOR JOINT-EQUALIZATION

CROSS REFERENCE TO RELATED APPLICATION(S)

The present application claims priority to International Patent Application No. PCT/IB2014/002209, entitled "EQUALIZER FOR JOINT-EQUALIZATION," filed on Sep. 23, 2014, the entirety of which is herein incorporated by reference.

FIELD OF THE INVENTION

This invention relates to an equalizer, a baseband processing unit, a method and a computer program for equalizing a composite signal received over a communication channel.

BACKGROUND OF THE INVENTION

In today's wireless networks that are designed to operate with a frequency reuse factor of one, such as HSPA (High Speed Packet Access) and LTE (Long Term Evolution), inter-cell interference is relatively high, particularly for users located near the cell edge but also at the base station level. One solution to this problem consists in providing advanced wireless reception techniques to mitigate multi-cell interference and increase the cell edge throughput. Such techniques mainly exploit the interference that exists between cells, rather than seeing them as problematic. For instance, at the base station level, it has been proposed to perform signal processing across multiple cells in a coordinated or cooperative fashion so as to enhance the received signal quality as well as decrease the received spatial interference, thus leading to a higher capacity per cell and, more importantly, an increased and homogeneous quality of service across cells. Namely, with these techniques such as uplink coordinated multipoint reception (CoMP), base station antennas are connected together through a high capacity backhaul network (e.g. via optical fiber links) so that data can be exchanged between them, then the multiple antenna RF (Radio Frequency) signals are processed jointly in order to better detect users that interfere with each other. This means, that operations such as equalization are jointly performed for the multiple antenna RF signals. Joint equalization may also be used in architectures such as C-RAN (cloud radio access network) or HetNet (Heterogeneous networks), where the equalization is jointly performed in a centralized processing based on multiple antenna RF signals originating from a plurality of remote radio units.

However, conventional equalizers which may be used in such scenarios are usually designed for equalizing signals originating from a predetermined number of antennas. Indeed, in today's field, most of available conventional equalizers are specifically designed to equalize signals originating solely from one, two, four or eight antennas. In such cases, conventional equalizers are not able to optimally operate in view of unsupported antenna configurations, such as three, five, six or seven antennas, which, however, are very likely to occur where techniques such as CoMP are employed or in C-RAN and HetNet, for instance.

Therefore, it would be desirable to have an improved equalizer that would be able to perform equalization under unsupported antenna configurations.

SUMMARY OF THE INVENTION

The present invention provides an equalizer, a baseband processing unit, a method and a computer program for equalizing a composite signal received over a communication channel, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIGS. 4-6 are schematic diagrams showing matrix operations performed by the equalizer of FIG. 3.

FIG. 7 is a schematic flow diagram of a method of equalizing a composite signal according to an embodiment of the subject application.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

Figure 1:
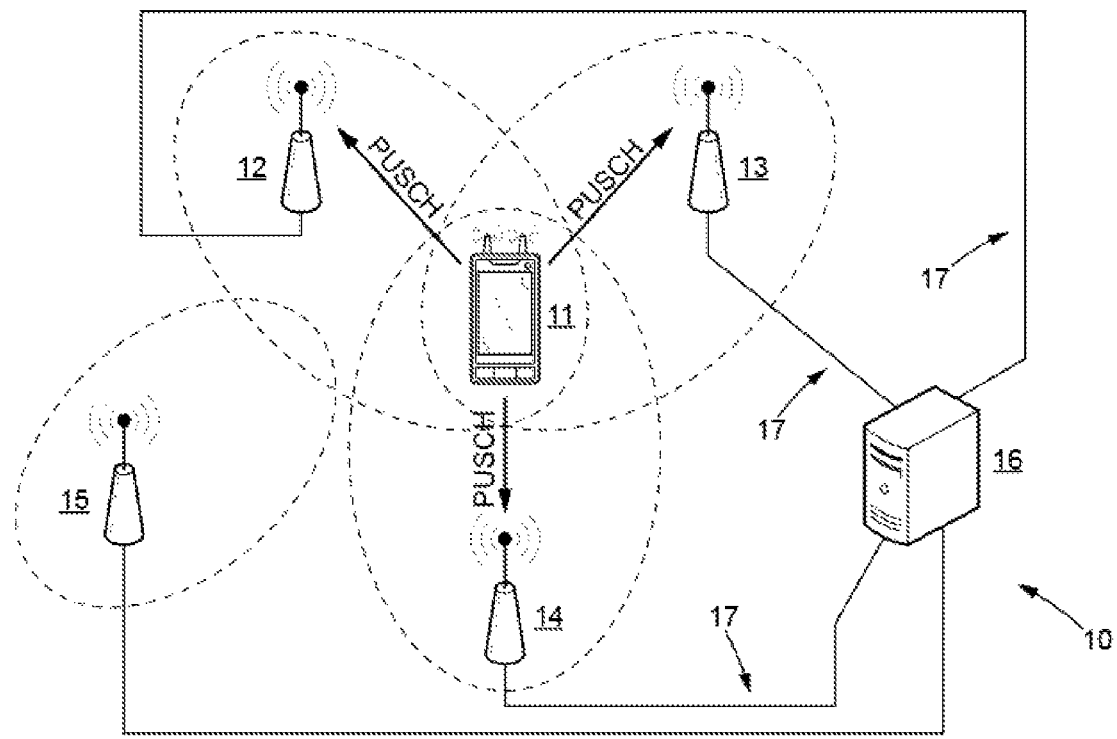
FIG. 1 is a schematic diagram of a communication system using a joint processing mechanism such as in C-RAN.

However, for a proper understanding of the subject application, the following detailed description will focus on the wireless communication system of FIG. 1. In FIG. 1, there is diagrammatically shown therein a schematic diagram of a communication system using a joint processing mechanism such as in C-RAN. In the example of FIG. 1, it will be considered a Long Term Evolution (LTE) network where the LTE Physical Uplink Shared Channel (PUSCH) communication channel is used. However, persons skilled in the art of communication networks will readily appreciate that the proposed solution may also apply to other channels at least in uplink, where those others communication networks and others channels exhibit the same characteristics as those described thereinafter. Further, skilled persons would also appreciate that equalization is hereinafter described for a single resource element (RE) and that specific parameters associated with each RE may be different without departing from the teachings of the proposed solution.

Referring FIG. 1, there is diagrammatically shown therein a wireless communication system 10 comprising:
  one user equipment (UE) 11;
  fours base stations (BS) 12, 13, 14, 15; and,
  a baseband processing unit (BBU) 16.

In the example of FIG. 1, the UE 11 comprises two transmitting antennas and is able to communicate with each BS 12, 13, 14, 15 over the LTE PUSCH channel. In FIG. 1, the UE 11 is attached to one of the BS 12, 13, 14 which is called the serving cell. Further, others BS 12, 13, 14 different from the serving cell are able to pick up signal from the UE 11, because the UE 11 is located at their cell edge. However, at the base station level, it can be taken advantage of this situation by using joint processing to exploit the multiple receptions at multiple BSs so as to jointly equalize the uplink signals received from the UE 11. In FIG. 1, the BBU 16 is arranged to perform joint processing on the communication system 10. Thereinafter, the BBU 16 will be considered as being a centralized processing unit as it is the case in C-RAN. However, one of ordinary skills in the art of communication systems would readily understand that the BBU 16 may be distributed as it could be the case with the CoMP technique. In an embodiment, the BBU 16 is further arranged to reduce ICI based on specific reception techniques such as Interference Rejection Combining (IRC). Further, it is to be noticed that in FIG. 1, the RF (Radio Frequency) functionality and baseband functionalities are split into two separate parts. Namely, each BS 12, 13, 14, 15 embodies the RF functionality by comprising one or more remote radio units (RRUs) usually mounted on the respective antenna mast(s) while the BBU 16 embodies the baseband functionality by supporting communication protocols such as the RRC (Radio Resource Control), PDCP (Packet Data Convergence Protocol), RLC (Radio Link Control), MAC (Medium Access Control) and physical layer protocols). Further, the BBU 16 is geographically located elsewhere in the communication system 10 with respect to the RRUs. Further, each BS 12, 13, 14, 15 comprises two receiving antennas and is operably coupled to the BBU 16, through a backhaul 17, for instance. More precisely, the exemplary backhaul 17, which may a fiber, wired or wireless backhaul for example, transports Inphase/Quadrature (I-Q) samples of down-converted RF signals from the RRUs to the BBU 16. This way, the BBU 16 is able to jointly process the received RF signals from the antennas associated with the BS 12, 13, 14, 15. For instance, joint equalization, as described above, may be performed by the BBU 16. However, conventional equalizers that may be used to perform such joint equalization are usually designed for equalizing RF signals originating from a predetermined given number M of receiving antennas which is predetermined. That is to say, in today's field, available conventional equalizers are specifically designed to equalize RF signals originating solely from one, two, four or eight receiving antennas. In a practical example, the BBU 16 may comprise one conventional equalizer which is specifically designed to equalize RF signals originating from two receiving antennas and another equalizer which is specifically designed to equalize RF signals originating from four receiving antennas. Of course, in practice, others configurations are also possible such as having one conventional equalizer which is specifically designed to equalize RF signals originating from two receiving antennas, another one which is specifically designed to equalize RF signals originating from six receiving antennas and another equalizer which is specifically designed to equalize RF signals originating from eight receiving antennas. One of ordinary skills in the field of communications systems knows that such variety of configurations of specifically designed equalizer for a BBU depends on the antenna configurations experienced in the field. In other words, it may be said that in today's field such arrangement of equalizers within a BBU is custom-made. Thereinafter, it would be considered that the BBU 16 comprises one conventional equalizer specifically designed to equalize RF signals originating from eight receiving antennas, such that M=8. This scenario is highly likely to occur, since with C-RAN, existing equalizers may be utilized. Hence, if such equalizer was used in a non-C-RAN system, at a base station having eight receiving antennas, it can also be used in C-RAN so as to handle eight remote receiving antennas.

Figure 2:
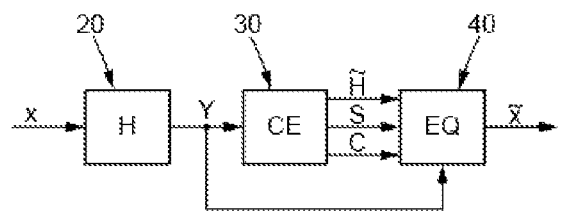
FIG. 2 is a schematic diagram of a wireless reception chain comprising a conventional equalizer.

Referring now to FIG. 2, there is diagrammatically shown therein wireless reception chain comprising a conventional equalizer. In FIG. 2, the wireless reception chain comprises:
  a communication channel such as a frequency selective fading channel 20;
  a channel estimation unit (CE) 20, such as a time-frequency interpolator or a channel estimator 30, for calculation a channel estimation of the communication channel; and,
  a conventional equalizer (EQ) 40 such as those which are normally encountered in networks such as the communication system 10.

In FIG. 2, the communication channel 20 is operably coupled to the CE 20 and the CE 20 is operably coupled to the EQ 40. In an example, such as in an OFDM receiver, there is comprised a conversion unit adapted to convert from the time domain to the frequency domain a received signal which has passed through the CE 20. It is to be noted that the CE 20 and the EQ 40 are arranged to perform matrix operations over vectors and matrices. Further in FIG. 2, the conventional EQ 40 is comprises in the BBU 16.

In the example of FIG. 2, after a composite signal x has passed through the communication channel 20, it is received, at the actually receiving antennas, a signal which is associated with a vector Y. Namely, the vector Y is of size N×1 where N corresponds to the number of actually receiving antennas, and is associated with a composite signal obtained after that the composite signal x has been transmitted over the communication channel 20. The composite signal x may comprise the information associated with one or more users of the communication system 10. In fact, for instance in LTE, in uplink, several users may transmit at the same time (e.g. subframe) on the same or overlapping subcarriers. In that case, equalization will also aim at helping retrieving the information associated with each user. Further, for the purpose of matrix operations, the transfer function of the communication channel 20 is represented by the matrix H which is of size N×L. The given number L corresponds to the number of simultaneous data streams (hereinafter layers) which are able to be received over the communication channel 20. It is to be noted that the number of layers is also known as the transmission rank in the literature and is defined as being the number of independent streams actually transmitted over a given channel. Thereinafter, it will be considered that two layers are used, such that L=2. Of course, others numbers of layers different from two may also contemplated in view of the subject application. Further, skilled persons would readily appreciate that the number of layers may be coming from one or more users. In FIG. 2, the CE 30 is arranged to produce, based on at least the vector Y:
  a channel response estimate data representing a channel estimation matrix $\hat{H}$ which is of size N×L and which is associated with a channel response estimation of the communication channel 20;
  a layer covariance data representing a layer covariance matrix C which is of size L×L and which is associated with the layers used in the communication channel 20; and,
  a noise covariance data representing a noise covariance matrix S which is of size N×N and which is associated with a noise level present at the actually receiving antennas.

In an embodiment the channel response estimate data, the layer covariance data and the noise covariance data are I-Q samples.

Still in FIG. 2, the EQ 40 is arranged to equalize the composite signal associated with the vector Y. Namely, the EQ 40 is arranged to produce an estimate data representing a transmitted signal vector x̃ which is of size L and which is associated with an estimation of the transmitted signal x.

However, referring back to FIG. 1, the EQ 40 comprised in the BBU 16 is not able to jointly equalize, in an optimized way, RF signals transmitted by the UE 11 where the UE 11 is located in an area simultaneously covered by the BS 12, 13, 14, at the same time. In fact, in that case, the EQ 40 which is optimized for eight receiving antennas (i.e. M=8), would not perform optimally since RF signals to be equalized originate from six receiving antennas (it is to be recalled that each BS 12, 13, 14 possesses two actually receiving antennas such that N=6). In fact, in that case M is different from N (i.e. M≠N), this situation is basically an unsupported antenna configuration scenario where RF signals from eight receiving antennas are expected by the conventional EQ 40 but RF signals from six receiving antennas are actually received instead. In such situation, as already acknowledged, the conventional EQ 40 16 is not able to perform and optimal equalization.

Figure 3:
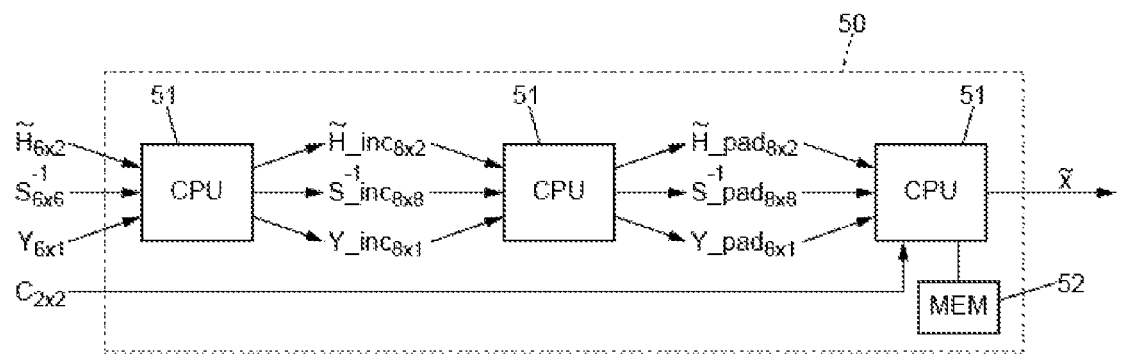
FIG. 3 is a schematic diagram of an exemplary equalizer according to embodiments of the subject application.

Referring now to FIG. 3, there is shown herein an equalizer 50 in accordance with embodiments of the subject application. The exemplary equalizer 50 of FIG. 3 can replace the EQ 40 in FIG. 2 and is arranged to equalize the composite signal associated with the vector Y. Namely, the equalizer 50 is arranged to produce an estimate data representing a transmitted signal vector x̃ which is of size L and which is associated with an estimation of the transmitted signal x. Further, with regards to equalizer 50, the number of supported antennas is eight (i.e. M=8). The equalizer 50 comprises:
- a processing unit such as a processor (CPU) 51; and,
- a memory unit (MEM) 52 such as a RAM or a ROM and which is operably coupled to the CPU 51.

In contrast to the conventional EQ 40, the equalizer 50 is arranged to support antenna configuration scenarios which are considered as unsupported by the conventional EQ 40. Namely, the equalizer 50 is arranged to perform an optimal equalization of a composite signal received on a given number N of antennas, where M is greater than N. More precisely, the CPU 51 is first arranged to increase the dimension associated with the given number N of actually receiving antennas, to the given number M of supported antennas. The increase of antenna dimension is performed by the CPU 51 at one or more similar positions with respect to Y, H̃ and $S^{-1}$, thereby producing Y_inc, H̃_inc and $S^{-1}$_inc, respectively, wherein $S^{-1}$_inc denotes the inverse matrix of S with the added dimensions. Namely, referring back to the example of FIG. 1, it is clear that M=8 and N=6 such that M is greater than N. In that case, as already stated above, an optimal equalization cannot be performed by the EQ 40.

However, the equalizer 50 is arranged to do so by first altering the antenna dimension of the vector Y and of the matrices H̃ and $S^{-1}$, from size N to size M. For example, it is made reference to FIG. 3 in view of FIGS. 4-6, where it is assumed that M=8 and N=6. In that case, Y is of size 6×1 (thereinafter referred to as $Y_{6 \times 1}$), H̃ is of size 6×2 (thereinafter referred to as $\tilde{H}_{6 \times 2}$) because as stated above there are two layers in the example of FIG. 1. Further, $S^{-1}$ is of size 6×6 (thereinafter referred to as $S^{-1}_{6 \times 6}$). Therefore, where the antenna dimension of vector Y and of the matrices H̃ and $S^{-1}$ is altered by the CPU 51 of the BBU 16, then the resulting vector Y_inc is of size 8×1 (thereinafter referred to as $Y\_inc_{8 \times 1}$), the resulting matrix H̃_inc is of size 8×2 (thereinafter referred to as $\tilde{H}\_inc_{8 \times 2}$) and the resulting matrix $S^{-1}$_inc is of size 8×8 (thereinafter referred to as $S^{-1}\_inc_{8 \times 8}$). As can be deduced from the foregoing, two more antenna dimensions have been added to Y, H̃ and $S^{-1}$ so as to produce Y_inc, H̃_inc and $S^{-1}$_inc. The foregoing alteration of the antenna dimension is performed at one or more similar positions with respect to Y, H̃ and $S^{-1}$.

Further, referring to FIG. 3 in view of FIGS. 4-6, the CPU 51 is also arranged to add padding elements ($Pad_x$ and $Pad_{x,y}$) to Y_inc, H̃_inc and $S^{-1}$_inc, at the one or more similar positions, thereby producing Y_pad, H̃_pad and $S^{-1}$_pad, respectively. In an example, the padding elements ($Pad_x$ and $Pad_{x,y}$) are zero-padding elements. Referring to FIGS. 4-6 in view of FIG. 1 and FIG. 3, there is shown therein:
- the vector $Y_{6 \times 1}$ and the resulting vector $Y\_pad_{8 \times 1}$;
- the matrix $\tilde{H}_{6 \times 2}$ and the resulting matrix $\tilde{H}\_pad_{8 \times 2}$
- the matrix $S^{-1}_{6 \times 6}$ and the resulting matrix $S^{-1}\_pad_{8 \times 8}$.

In one embodiment, the one or more similar positions are located above and/or below Y, H̃ and $S^{-1}$. That is to say that the alteration of the antenna dimension is performed at the same location with respect to Y, H̃ and $S^{-1}$, altogether. For instance, in the case where the padding elements ($Pad_x$ and $Pad_{x,y}$) are zero-padding elements and where two antenna dimensions are added above Y, these two additional antenna dimensions should also be added to H and $S^{-1}$, in a similar way (i.e. above H̃ and $S^{-1}$). With regards to Y and H̃, adding above two more antenna dimensions, would correspond to adding two more rows above the existing rows of Y and H̃. However, regarding $S^{-1}$, adding above two more antenna dimensions, would correspond to adding two more rows above the existing rows of $S^{-1}$ and also adding two more columns before the existing columns of $S^{-1}$. Indeed, as $S^{-1}$ is a square matrix of size N×N, where N is associated with the antenna dimension as stated above, thus altering the antenna dimension $S^{-1}$ should occur at both the row and column levels. In one example, where the padding elements ($Pad_x$ and $Pad_{x,y}$) are zero-padding elements and where the two antenna dimensions are added below Y, there are similarly added below H̃ and $S^{-1}$. With regards to Y and H̃, adding below two more antenna dimensions, would correspond to adding two more rows below the existing rows of Y and H̃. However, regarding $S^{-1}$ for the same reasons as described above, adding below two more antenna dimensions, would correspond to adding two more rows below the existing rows of $S^{-1}$ and also adding two more columns after the existing columns of $S^{-1}$. In another example, where the padding elements ($Pad_x$ and $Pad_{x,y}$) are zero-padding elements and where the two antenna dimensions are simultaneously added above and below Y, there are similarly added above and below H̃ and $S^{-1}$. With regards to Y and H̃, adding above and below, two more antenna dimensions, would correspond to adding one more row above the existing rows of Y and H̃ and adding one more row below the existing rows of Y and H̃. However, regarding $S^{-1}$ for the same reasons as described above, adding above and below, two more antenna dimensions, would correspond to adding one more row above the existing rows of $S^{-1}$ along with adding one more column before the existing columns of $S^{-1}$ and also adding one more row below the existing rows of $S^{-1}$ along with adding one more column after the existing columns of $S^{-1}$. In that example, the matrix $S^{-1}$ is surrounded by the added antenna dimensions.

Further, the CPU 51 is also arranged to produce the estimate data representing the transmitted signal vector $\tilde{x}$ based on $y_{pad}$, $\tilde{H}_{pad}$, C and $S^{-1}_{pad}$. In an embodiment, the equalizer 50 is arranged to produce the estimate data representing the transmitted signal vector $\tilde{x}$ from the following equation:

$$\tilde{x} = (\tilde{H}_{pad}{}^H \times S^{-1}{}_{pad} \times \tilde{H}_{pad} + C^{-1})^{-1} \times \tilde{H}_{pad}{}^H \times S^{-1}{}_{pad} \times Y_{pad} \quad (1)$$

wherein $(\bullet)^H$ denotes a hermitian transpose operator. Of course, others equations may be contemplated as well without departing from the teachings of the subject application. In an example, an with regards to the example of FIG. 3 in view of FIGS. 4-6, the equation (1) can be rewritten as follows:

$$\tilde{x} = (\tilde{H}_{pad_{2\times 8}}{}^H \times S^{-1}_{pad_{8\times 8}} \times \tilde{H}_{pad_{8\times 2}} + C^{-1}_{2\times 2})^{-1} \times \tilde{H}_{pad_{2\times 8}}{}^H \times S^{-1}_{pad_{8\times 8}} \times Y_{pad_{8\times 1}} \quad (1)$$

The equation (1) is used by the equalizer 50 where it is performed a linear equalization able to suppress the interference signals with the aid of multiple receiving antennas while detecting the desired signal. In that case, it is considered that the same interfering signals are present at a plurality of the receiving antennas such that the RF received signals can be combined to suppress these interfering signals in addition to combating desired signal fading. An example of such linear equalizer is the MMSE-IRC equalizer which stands for Minimum Mean Square Error detector with Interference Rejection Combining. As it is known for a person skilled in the art of communication systems, a MMSE-IRC equalizer suppresses inter-cell interferences by utilizing the correlation of the interference signals (i.e. the covariance matrices) in addition to the desired signal (i.e. the channel matrix). In practical applications, these matrices are estimated using the RF received signals (e.g. the pilot signals or the data signals). For instance, in LTE, demodulation reference signal (DMRS) can be used as it serves to estimate the transmission channel condition which is transmitted with the PUSCH channel.

It can be mathematically demonstrated that the estimate data representing the transmitted signal vector $\tilde{x}$ obtained using the equation (2) is equivalent to estimate data obtained from the following equation:

$$\tilde{x} = (\tilde{H}_{2\times 6}{}^H \times S^{-1}_{6\times 6} \times \tilde{H}_{6\times 2} + C^{-1}_{2\times 2})^{-1} \times \tilde{H}_{2\times 6}{}^H \times S^{-1}_{6\times 6} \times Y_{6\times 1} \quad (3)$$

wherein $(\bullet)^H$ denotes a hermitian transpose operator and $\tilde{H}_{2\times 2}$, $S^{-1}_{6\times 6}$, $C^{-1}_{2\times 2}$ and $Y_{6\times 1}$ are matrices and vector associated with a linear equalization process of a composite signal in a communication system where M=N=6. Namely, the equation (3) may be used by a conventional equalizer, such as the EQ 40, but which is specifically designed to equalize RF signals originating from six receiving antennas and where the composite signal is received on six actual receiving antennas. In that case, it is clear that there is a perfect match between the number of antennas supported by the conventional equalizer and the number actually receiving antennas. Hence, having equation (2) being equivalent to the equation (3) means that an antenna configuration which is not supported by the conventional EQ 40 can be supported the equalizer 50 of the subject application, since the equalizer 50 produces the same results a conventional equalizer specifically designed for the antenna configuration of concern. Namely, referring to FIGS. 4-6, we have:

(a) $\tilde{H}^H_{pad_{2\times 8}} \times$ $$S^{-1}_{pad_{8\times 8}} = \begin{bmatrix} \tilde{H}^H_{2\times 6} & 0 & 0 \\ & 0 & 0 \end{bmatrix} \times \begin{bmatrix} S^{-1}_{6\times 6} & 0 & 0 \\ 0 & 0 & 0 \\ 0 & 0 & 0 \end{bmatrix} = \begin{bmatrix} \tilde{H}^H_{2\times 6} \times S^{-1}_{6\times 6} & 0 & 0 \\ & 0 & 0 \end{bmatrix}$$

(b) $\tilde{H}^H_{pad_{2\times 8}} \times S^{-1}_{pad_{8\times 8}} \times \tilde{H}_{pad_{8\times 2}} = \begin{bmatrix} \tilde{H}^H_{2\times 6} \times S^{-1}_{6\times 6} & 0 & 0 \\ & 0 & 0 \end{bmatrix} \times \begin{bmatrix} \tilde{H}_{6\times 2} \\ 0 & 0 \\ 0 & 0 \end{bmatrix} =$ $$\tilde{H}^H_{2\times 6} \times S^{-1}_{pad_{6\times 6}} \times \tilde{H}_{6\times 2}$$

(c) $(\tilde{H}^H_{pad_{2\times 8}} \times S^{-1}_{pad_{8\times 8}} \times \tilde{H}_{pad_{8\times 2}} + C^{-1}_{2\times 2})^{-1} \times \tilde{H}^H_{pad_{2\times 8}} \times S^{-1}_{pad_{8\times 8}} =$ $$(\tilde{H}^H_{2\times 6} \times S^{-1}_{6\times 6} \times \tilde{H}_{6\times 2} + C^{-1}_{2\times 2})^{-1} \times \begin{bmatrix} \tilde{H}^H_{2\times 6} \times S^{-1}_{6\times 6} & 0 & 0 \\ & 0 & 0 \end{bmatrix} =$$

$$\begin{bmatrix} (\tilde{H}^H_{2\times 6} \times S^{-1}_{6\times 6} \times \tilde{H}_{6\times 2} + C^{-1}_{2\times 2})^{-1} \times \tilde{H}^H_{2\times 6} \times S^{-1}_{6\times 6} & 0 & 0 \\ & 0 & 0 \end{bmatrix}$$

(d) $(\tilde{H}^H_{pad_{2\times 8}} \times S^{-1}_{pad_{8\times 8}} \times \tilde{H}_{pad_{8\times 2}} + C^{-1}_{2\times 2})^{-1} \times \tilde{H}^H_{pad_{2\times 8}} \times S^{-1}_{pad_{8\times 8}} \times Y_{pad_{8\times 1}} =$ $$\left[ (\tilde{H}^H_{2\times 6} \times S^{-1}_{6\times 6} \times \tilde{H}_{6\times 2} + C^{-1}_{2\times 2})^{-1} \times \right.$$

$$\left. \tilde{H}^H_{2\times 6} \times S^{-1}_{6\times 6} \begin{bmatrix} 0 & 0 \\ 0 & 0 \end{bmatrix} \right] \times \begin{bmatrix} Y_{6\times 1} \\ 0 \\ 0 \end{bmatrix} =$$

$$(\tilde{H}^H_{2\times 6} \times S^{-1}_{6\times 6} \times \tilde{H}_{6\times 2} + C^{-1}_{2\times 2})^{-1} \times \tilde{H}^H_{2\times 6} \times S^{-1}_{6\times 6} \times Y_{6\times 1}$$

It is clear from steps (a)-(d) that the estimate data obtained by a conventional equalizer using the equation (3) is equivalent to the estimate data obtained by the equalizer 50 of the subject application using the equation (2).

Referring to FIG. 7, there is diagrammatically shown therein a schematic flow diagram of a method of equalizing a composite signal received over a communication channel according to an embodiment of the subject application. In S60, it is tested whether the number N of receiving antennas associated with the received composite signal is lower than the number M of antennas supported by the equalizer 50, for the same reasons as explained above. If it M is not greater than N, then the method stops. However, if M is greater than N, then in S61, the CPU 51 is arranged to increase the dimension associated with the given number N of antennas, to the given number M of antennas thereby producing Y_inc, $\tilde{H}$_inc and $S^{-1}$_inc, as already described above. Later, in S62, the CPU 51 is further arranged to add padding elements (Pad$_x$ and Pad$_{x,y}$) to Y_inc, $\tilde{H}$_inc and $S^{-1}$_inc thereby producing Y_pad, $\tilde{H}$_pad and $S^{-1}$_pad as already described above. Finally, at S63, the CPU 51 is also arranged to produce the estimate data representing the transmitted signal vector $\tilde{x}$ based on Y_pad, $\tilde{H}_{pad}$, C and $S^{-1}_{pad}$.

It has now become clear that the proposed solution brings improvements over conventional equalizers specifically designed to support one antenna configuration by allowing the support of a plurality of antenna configurations, as explained above, as if those additional antenna configurations were specifically designed in the conventional equalizer at the outset. Hence, the proposed solution could be seen as an upgrade applicable to existing conventional equalizers. Advantageously, such upgrade could be performed through a firmware upgrade (or by driver upgrade) on hardware conventional equalizers or through software for software equalizers. Such solution leads to a better time to market for designers of equalizers. Indeed, with the solution of the subject application, it is only required to specifically design an equalizer for one given antenna configuration (e.g. the highest such as 32 or 64 antennas) and then all the lowest antenna configurations will be supported as well. This will reduce the testing time required to deliver the final product.

The above description elaborates embodiments of the subject application with regard to a PUSCH channel of a LTE wireless network. However, those skilled in the art of communication systems will readily understand, on the basis of the teachings of the present application, that RF received signals transmitted over others channels of others wireless networks but embodying the same characteristics as the PUSCH, may be equalized according to the teachings of the subject application.

Of course, the above advantages are exemplary, and these or other advantages may be achieved by the proposed solution. Further, the skilled person will appreciate that not all advantages stated above are necessarily achieved by embodiments described herein. For instance, others equalization equations which are not linear may be used along with the teachings of the subject application without requiring an undue effort of the skilled person. Also, padding elements ($Pad_x$ and $Pad_{x,y}$) may be non-zero padding elements. This would mainly depend on the type of equalization equation used.

It is also claimed a baseband unit such as the BBU 16, the baseband unit comprising the equalizer 50 as claimed wherein the equalizer 50 is operably coupled to one or more remote radio units (RRUs). For instance, the claimed equalizer 50 may be coupled to the RRUs via fiber links. It is thus clear that the RRUs and the claimed baseband unit are geographically located at different locations within a communication system wherein joint processing such as in C-RAN, may be implemented.

The proposed solution may also be implemented in a computer program product stored in a non-transitory computer-readable storage medium that stores computer-executable code which causes a processor computer to perform the operation of the claimed equalizer 50 and/or the exemplary method as illustrated in the foregoing description, for instance.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, multipoint-to-point telecommunication equipment and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims. For instance, it has been described a baseband unit comprising only one equalizer natively supporting one configuration but able to supports a plurality of other antenna configurations based on the teachings of the subject application. However, it can also be contemplated cases where a baseband unit comprises one or more conventional equalizers and one or more claimed equalizers. Such situation could occur depending on the needs coming from the field. In that case, a processing unit of the baseband unit such as a processor may be used to determine which equalizer between the conventional ones and the claimed ones, should be used. Further, it can be contemplated the case where the BBU is not a centralized processing but rather a distributed processing where, for instance, the BS 12, 13, 14, 15 are connected together so that data can be exchanged between them through the core-network, for example. Still further, although the LTE radio communications system is described as an example in the foregoing exemplary embodiment, the present invention is not limited to LTE radio communications systems but also can be applied other radio communications systems that include a plurality of receiving antennas. Moreover, the wireless communication system using the joint processing scheme may be any one of: a cloud radio access network (C-RAN), a distributed antenna system (DAS) or a heterogeneous network (also known as HetNet). Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For instance, joint processing may be performed for both channel estimation and equalization within a single apparatus.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An equalizer for equalizing a composite signal originating from a given number L of simultaneous data streams, hereinafter layers, able to be received over a communication channel, on a given number M of antennas, at one or more radio units, in a wireless communication system, the equalizer comprising:
    a processing unit such as a processor; and,
    a memory unit operably coupled to the processing unit;
    wherein the processing unit is arranged to produce an estimate data representing a transmitted signal vector $\tilde{x}$ of size L, associated with an estimation of a transmitted signal received at the one or more radio units, based on:
        a received signal data representing a received signal vector Y of size N×1, associated with the received composite signal;
        a channel response estimate data representing a channel estimation matrix $\tilde{H}$ of size N×L, associated with a channel response estimation of the communication channel;
        a layer covariance data representing a layer covariance matrix C of size L×L, associated with the layers able to be received over the communication channel; and,
        a noise covariance data representing a noise covariance matrix S of size N×N, associated with a noise level present at the antennas;
    wherein, when the composite signal is received on a given number N of antennas, where M is greater than N, the processing unit is arranged to:
        increase the dimension associated with the given number N of antennas, to the given number M of antennas, at one or more similar positions with respect to Y, $\tilde{H}$ and $S^{-1}$, thereby producing Y_inc, $\tilde{H}$_inc and $S^{-}$_inc, respectively, wherein $S^{-1}$ denotes the inverse matrix of S;
        add padding elements to Y_inc, $\tilde{H}$_inc and $S^{-1}$_inc, at the one or more similar positions, thereby producing Y_pad, $\tilde{H}$_pad and $S^{-1}$_pad, respectively; and,
        produce the estimate data representing the transmitted signal vector $\tilde{x}$ based on Y_pad, $\tilde{H}$_pad, C and $\widetilde{S^{-1}}$_pad.

2. The equalizer of claim 1, wherein the one or more similar positions are located above and/or below Y, $\tilde{H}$ and $S^{-1}$.

3. The equalizer of claim 1, wherein the padding elements are zero-padding elements and wherein the estimate data representing the transmitted signal vector $\tilde{x}$ is obtained from following equation:

$$\tilde{x}=(\tilde{H}_{pad}^H \times S^{-1}{}_{pad} \times \tilde{H}_{pad}+C^{-1})^{-1}\times \tilde{H}_{pad}^H \times S^{-1}\times Y_{pad}$$

wherein $(\bullet)^H$ denotes a hermitian transpose operator.

4. The equalizer of claim 1, wherein the communication channel is a LTE Physical Uplink Shared Channel, PUSCH.

5. The equalizer of claim 1, wherein the wireless communication system uses a joint processing scheme and is any one of: a cloud radio access network, C-RAN, a distributed antenna system, DAS, or a heterogeneous network, HetNet.

6. The equalizer of claim 5 wherein the joint processing scheme is the multi-cell Interference Rejection Combining, IRC, technique.

7. A baseband processing unit, BBU, comprising:
    the equalizer of claim 1, operably coupled to one or more remote radio units, RRUs.

8. A method of equalizing a composite signal originating from a given number L of simultaneous data streams, hereinafter layers, able to be received over a communication channel, on a given number M of antennas, at one or more radio units, in a wireless communication system, the method comprising:
    producing an estimate data representing a transmitted signal vector $\tilde{x}$ of size L, associated with an estimation of a transmitted signal received at the one or more radio units, based on:
        a received signal data representing a received signal vector Y of size N, associated with the received composite signal;
        a channel response estimate data representing a channel estimation matrix $\tilde{H}$ of size N×L, associated with a channel response estimation of the communication channel;

a layer covariance data representing a layer covariance matrix C of size L×L, associated with the layers able to be received over the communication channel; and, a noise covariance data representing a noise covariance matrix S of size N×N, associated with a noise level present at the antennas;

wherein, when the composite signal is received on a given number N of antennas, where M is greater than N, the method further comprises:

increasing the dimension associated with the given number N of antennas, to the given number M of antennas, at one or more similar positions with respect to Y, $\tilde{H}$ and $S^{-1}$, thereby producing Y_inc, $\tilde{H}$_inc and $S^{-1}$_inc, respectively, wherein $S^{-1}$ denotes the inverse matrix of S;

adding padding elements to Y_inc, $\tilde{H}$_inc and $S^{-1}$_inc, at the one or more similar positions, thereby producing Y_pad, $\tilde{H}$_pad and $S^{-1}$_pad, respectively; and, producing the estimate data representing the transmitted signal vector $\tilde{x}$ based on Y_pad, $\tilde{H}$_pad, C and $\widetilde{S^{-1}}$_pad.

9. The method of claim 8, wherein the one or more similar positions are located above and/or below Y, $\tilde{H}$ and $S^{-1}$.

10. The method of claim 8, wherein the padding elements are zero-padding elements and wherein the estimate data representing the transmitted signal vector $\tilde{x}$ is obtained from following equation:

$$\tilde{x}=(\tilde{H}\_pad^H \times S^{-1}_{pad} \times \tilde{H}\_pad + C^{-1})^{-1} \times \tilde{H}\_pad \times S^{-1}_{pad} \times Y\_pad$$

wherein $(\bullet)^H$ denotes a hermitian transpose operator.

11. The method of claim 8, wherein the communication channel is a LTE Physical Uplink Shared Channel, PUSCH.

12. The method of claim 8, wherein the wireless communication system uses a joint processing scheme and is any one of: a cloud radio access network, C-RAN, a distributed antenna system, DAS, or a heterogeneous network, HetNet.

13. The method of claim 12 wherein the joint processing scheme is the multi-cell Interference Rejection Combining, IRC, technique.

14. A computer program product stored in a non-transitory computer-readable storage medium that stores computer-executable code for equalizing a composite signal originating from a given number L of simultaneous data streams, hereinafter layers, able to be received over a communication channel, on a given number M of antennas, at one or more radio units, in a wireless communication system, the computer-executable process causing a processor computer, when the composite signal is received on a given number N of antennas, where M is greater than N, to perform the method according to claim 8.

* * * * *